Jan. 9, 1934.  W. E. FRANK  1,942,960

PISTON EXPANDER

Filed Feb. 15, 1932

William E. Frank, INVENTOR

BY Victor J. Evans & Co

ATTORNEYS

Patented Jan. 9, 1934

1,942,960

UNITED STATES PATENT OFFICE 1,942,960

PISTON EXPANDER

William E. Frank, Willow Grove, Pa., assignor, by mesne assignments, to Ramsey Accessories Manufacturing Corporation, St. Louis, Mo., a corporation of Missouri Application February 15, 1932. Serial No. 593,101

1 Claim. (Cl. 309—12)

It is well known that after an automobile has operated to an extent that it registers anywhere from 10,000 to 15,000 miles, the pistons operate loosely, very often causing knocks consequently resulting in the loss of power.

Therefore, the present invention relates to an improved piston expander, the purpose being to take up any lost motion, and thereby overcome the knocks and re-establish the normal power of the automobile.

Another purpose is to provide, in a piston, an annular channel or groove on the interior of the piston, adapted for the reception of an expander, especially of the spring ring type, which sets in the annular groove or channel and thereby tends toward expanding the wall of the piston in order to closely fit the wall of the combustion chamber of an engine.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawing and claimed.

In the drawing:—

Figure 1:
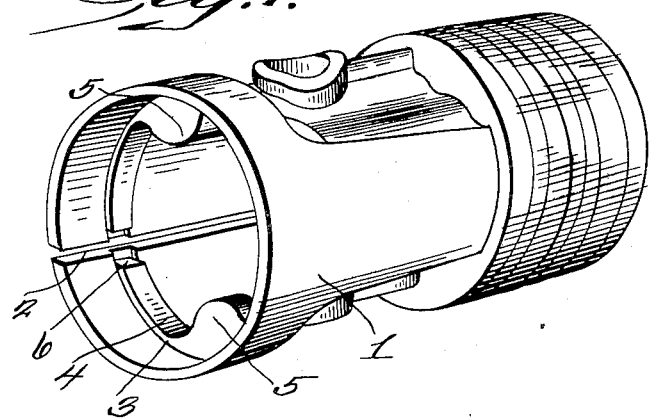
Figure 1 is a view showing a piston of the conventional construction, illustrating the spring type of expander as applied.

Referring to the drawing, 1 identifies a piston, which may be any conventional type or construction now in use. The majority of pistons have their walls split as shown at 2, in order to cause the piston to fit as tight as possible within the cylinder, and interiorly it is provided with an annular groove or channel 3.

A spring expanding ring 4 is provided adapted to seat in the annular groove or channel as shown in Figure 1 and is provided with diametrically opposite enlargements 5, which act to provide for resiliency in the ring on both sides of said enlargements. The ring is split or open at 6, the ring being made of a diameter sufficiently large to allow it to be contracted, inserted in the piston and then locked in the groove or channel wherein it is allowed to expand, and hence causing the piston wall to expand, so as to cause the piston wall to closely engage with the interior surface of the combustion chamber of the engine, in such a manner as to take up lost motion, or loose fitting of the piston in the cylinder, and hence preventing knocks when the engine is operating.

The enlargements 5, 5 have the effect of increasing the resilience of the ring on either side of said enlargements so that the tension of the ring 4 is primarily exerted on both sides of the split 2 of the skirt and diametrically opposite thereto. This causes the skirt of the piston 1 to be expanded a greater amount along the diameter of the piston lying in the same plane as the split 2 of the skirt. Thus the ring 4 reenforces the skirt immediately adjacent to the split 2 at the points where it is most likely to collapse due to the weakening of the piston caused by the split 2. Then, too, there is less pressure exerted on the parts of the skirt in the plane of the axis of the pin bosses or the parts of the piston subjected to the thrust of the connecting rod when the piston is in operation.

Figure 3:
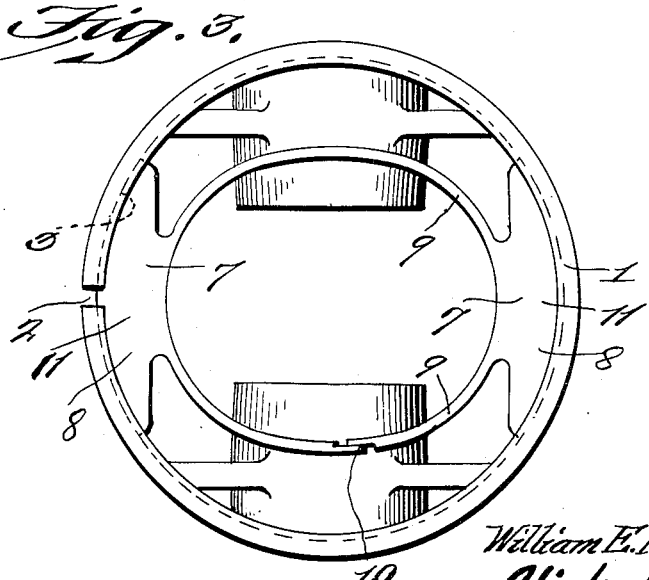
Figure 3 is an end view of a piston, showing the annular groove or channel in dotted lines and illustrating a modified construction of expander applied.

In Fig. 3 I show a modified form of invention in which cross pieces 7, 7 are employed for contact with the piston skirt at points adjacent the split 2 and opposite thereto.

The opposite heads or ends 8 of the spider are arcuate in formation, in such a manner as to fit the groove or channel 3 on the interior of the piston. These heads or ends 8 are united by a ring portion 9, which is split or open at 10, thereby allowing the cross piece or ring portion 9 to expand and in turn cause the wall of the piston to expand and closely fit the engine cylinder.

Figure 2:
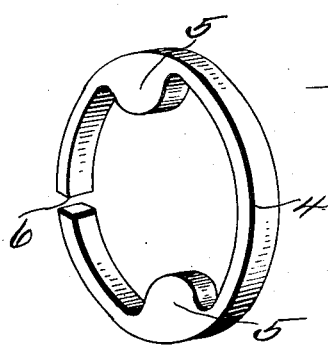
Figure 2 is a detailed perspective view of the spring ring type of expander.

Referring to Figure 3 it will be noted that where the opposite edge or ends of the expander integrally unite with the ring body heavy or thickened parts 11 are provided, serving the same function as the enlargements 5 in the form shown in Figures 1 and 2, in other words insuring resiliency for the ring body, and hence causing the ring body to expand.

The invention having been set forth, what is claimed is:

A piston having the usual skirt section and wrist pin bosses therein, said skirt section being longitudinally slotted along a plane intersecting the axial plane of the bosses, an annular expanding element fixed within the skirt and contacting therewith, said element being divided adjacent to the slot in the skirt and thickened at right angles thereto so as to reduce the expansibility of the element in the thickened zones of said expanding element.

WILLIAM E. FRANK.